P. MOEWS.
SPECTACLE MOUNTING.
APPLICATION FILED JULY 18, 1908.
975,778.
Patented Nov. 15, 1910.
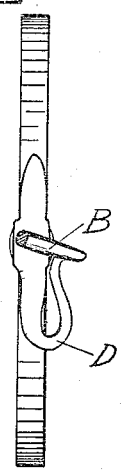
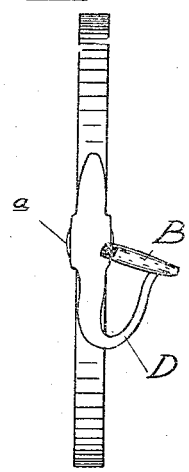
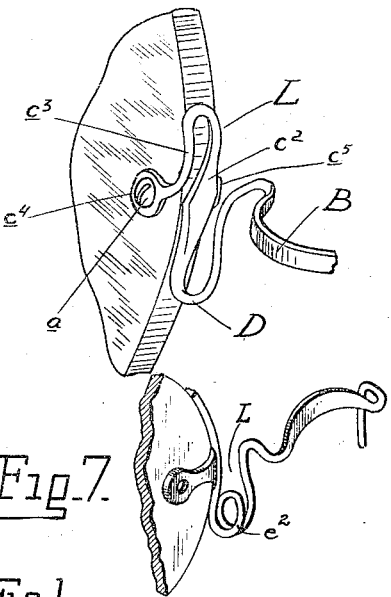
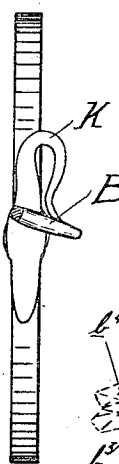
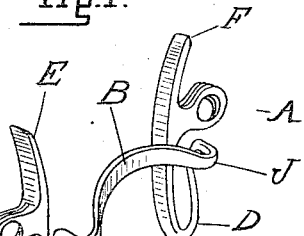
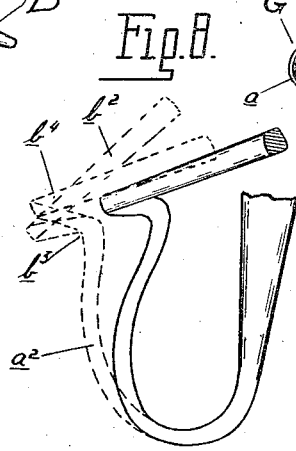
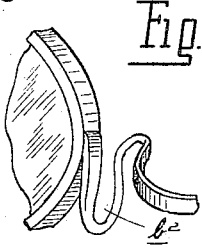
Witnesses
W. C. Ford
N. J. Belknap
Inventor
Paul Moews
By Whittemore, Hulbert & Whittemore
Attys

UNITED STATES PATENT OFFICE.

PAUL MOEWS, OF DETROIT, MICHIGAN.

SPECTACLE-MOUNTING.

975,778.

Specification of Letters Patent. Patented Nov. 15, 1910.

Application filed July 18, 1908. Serial No. 444,259.

*To all whom it may concern:*

Be it known that I, PAUL MOEWS, a citizen of the United States of America, residing at Detroit, in the county of Wayne and State of Michigan, have invented certain new and useful Improvements in Spectacle-Mountings, of which the following is a specification, reference being had therein to the accompanying drawings.

The invention relates particularly to a fitting or mounting for eyeglasses or spectacles either of the rim or rimless type, and consists in the novel construction thereof whereby the relative positions of the nose bridge and lenses may be varied at will to accommodate the lenses to the eyes of the wearer.

The invention further consists in the peculiar arrangement and combination of the fitting parts, and in various details of construction as will be more fully hereinafter set forth.

In the drawings,—Figure 1 is a detached perspective view of a mounting embodying my invention; Fig. 2 is a cross section through the mounting, showing the same applied to a lens; Fig. 3 is a view similar to Fig. 2, showing parts of the mounting in an adjusted position; Fig. 4 represents a cross section through a mounting of modified form; Figs. 5, 6 and 7 are sectional perspective views of further modifications; and Fig. 8 is an enlarged detail view, showing in full lines the normal position of the adjustable connections and bridge, and in dotted lines the position of the parts after adjustment.

With reference particularly to Fig. 1 of the drawings, A represents the preferred form of mounting adapted for use in connection with eyeglasses or rimless spectacles, and formed preferably from a single piece or strip of metal. It comprises essentially a nose bridge B of the saddle type adapted to rest upon the nose of the wearer, and loop members C and D forming adjustable connections between the bridge and the lenses, permitting the parts to be shifted in a horizontal plane to set the lenses away from or toward the eyes of the wearer as may be required. In the figure referred to, the fitting is provided with lens braces E and F and the usual straps G adapted to be clamped to the lenses by suitable screws $a$. The loop members extend preferably in vertical parallel planes perpendicular to the plane of the lenses so as to permit upon spreading movement the projection of the lenses away from the eyes of the wearer, or by the closing of the loops the shifting of the lenses toward the bridge.

In spectacle, or eyeglass construction where a saddle bridge is employed, the bridge proper, for well known reasons, is positioned centrally of the lenses and in certain angular relation thereto, and it is desirable in an adjustable fitting that these relations between the parts should be maintained regardless of the distance between the lenses and nose piece. In the present construction of fitting, it will be obvious that the spreading or closing of the loop members will throw to a greater or less extent the bridge into an angular position in relation to the lenses different from that required. I have accordingly provided means in the form of bends I J at the extremities of the bridge, permitting not only the setting of the bridge upwardly or downwardly into the desired angular position, but also into the plane the bridge originally occupied centrally of the lenses. Furthermore, these bends form offsets longitudinally of the bridge, which place the adjusting loops in inconspicuous positions in close proximity to the meeting ends of the lenses, so that practically only the nose piece or bridge and the lens straps will be seen.

Referring to Fig. 8 of the drawings, the normal position of the adjusting loops and bridge is shown, and in Figs. 2, 3 and 4 the desired position of the bridge centrally of the lenses is illustrated. The dotted lines indicated by the reference-letter $a^2$ show the position of the inner leg or member of the loop upon an adjustment for projecting the lenses forwardly from the eyes of the wearer, and the reference-letter $b^2$ shows the corresponding position of the bridge. It will be seen that the bridge, by the bending of the loop, is upturned, thus occupying a different angular relation than that desired. If the bridge was united at its ends directly with the loops, and bent downwardly into the desired position, it will be seen that while in the proper angular relation it will occupy a plane below the lens centers. By means of the bends previously referred to, the bridge may be bent at the points $b^3$, which will throw the same into the angular relation with the lenses required, and at the same time the entire bridge will be thrown upwardly so as to occupy its original central position in relation to the lenses, this latter position being indicated by the dotted lines $b^4$.

In the modification shown in Fig. 4 the fitting is of the same general construction as that heretofore described, with the exception that the loops project upwardly, as indicated by the reference-letter K, the horizontal adjustment of the parts being effected as well with the loop in this position as in the depending position previously set forth.

In both forms of fitting described the loops are preferably so fashioned that one leg or member of each, as $a'$, bears against the edge of the lens, forming a brace therefor and a continuation of the main brace E or F. The structure is thus made more compact and the adjustable portions of the fitting less conspicuous.

In Fig. 5 a still further modification is shown, the upper portion or member of the lens brace being in the form of a loop, as L, one section $c^2$ thereof bearing against the lens and forming a brace proper, and the other member $c^3$ extending in a plane parallel with the leg section $c^2$, and then outwardly, terminating in an apertured end portion $c^4$ through which the screw $a$ extends. The opposite side of the loop described is provided with a strap $c^5$ of ordinary construction, which acts in conjunction with the leg section $c^3$ to support the lens.

In Fig. 6 I have shown my improved fitting as applied to the usual framed spectacle, the lens braces being dispensed with in this form and the outer section $b^2$ of the adjustable loop attached in any suitable manner to the lens rim.

A modified form of adjusting loop is shown in Fig. 7, indicated by the reference-letter L. Here the loop proper is of the open type, as previously described, but its lower or closed end terminates in a coil $e^2$ extending in the plane of the loop.

What I claim as my invention is,—

A lens mounting comprising a saddle bridge having reflexed end portions, elongated vertical loops, and lens braces, the loops and reflexed portions being bendable and positioned to permit a relative lateral adjustment between the braces and bridge and vertical rocking movement of the latter to compensate for the adjustment.

In testimony whereof I affix my signature in presence of two witnesses.

PAUL MOEWS.

Witnesses:
NELLIE KINSELLA,
JAMES P. BARRY.